US012732702B2

(12) United States Patent
Zhang et al.

(10) Patent No.: US 12,732,702 B2
(45) Date of Patent: Sep. 8, 2026

(54) OBJECT TRACKING USING CAMERAS

(71) Applicant: Shenzhen Oceanwing Smart Innovations Technology Co., Ltd, Shenzhen (CN)

(72) Inventors: Chao Zhang, Shenzhen (CN); Shijun Huang, Shenzhen (CN); Binhan He, Shenzhen (CN)

(73) Assignee: Shenzhen Oceanwing Smart Innovations Technology Co., Ltd., Shenzhen (CN)

( * ) Notice: Subject to any disclaimer, the term of this patent is extended or adjusted under 35 U.S.C. 154(b) by 36 days.

(21) Appl. No.: 18/813,207

(22) Filed: Aug. 23, 2024

(65) Prior Publication Data

US 2025/0071425 A1 Feb. 27, 2025

(30) Foreign Application Priority Data

Aug. 25, 2023 (CN) ......................... 202311086373.0

(51) Int. Cl.

*G06V 20/52* (2022.01)
*H04N 23/61* (2023.01)
*H04N 23/695* (2023.01)
*H04N 23/90* (2023.01)

(52) U.S. Cl.

CPC ........... *H04N 23/695* (2023.01); *G06V 20/52* (2022.01); *H04N 23/61* (2023.01); *H04N 23/90* (2023.01)

(58) Field of Classification Search

None

See application file for complete search history.

(56) References Cited

U.S. PATENT DOCUMENTS

2017/0104929 A1 4/2017 Ono
2022/0144186 A1 5/2022 Heafitz et al.
2023/0020616 A1* 1/2023 Manzari ................. H04N 23/69
2023/0199295 A1* 6/2023 Jansson ................. G01S 3/7864 348/46
2023/0289997 A1* 9/2023 Yu .......................... H04N 23/90

FOREIGN PATENT DOCUMENTS

CN 113473024 A 10/2021
WO 2012151777 A1 11/2012

OTHER PUBLICATIONS

Dec. 18, 2024 (EP) Search Report of App. 24196198.

* cited by examiner

*Primary Examiner* — Eileen M Adams
(74) *Attorney, Agent, or Firm* — Banner & Witcoff, Ltd.

(57) ABSTRACT

An object tracking method comprises: obtaining, using a first camera, a first image of a scene and obtaining, using a second camera, a second image of the scene. A field of view of the first camera is greater than a field of view of the second camera. The method further comprises determining a target based on the first image; and determining, based on the second image, that the target meets a tracking requirement. The method further comprises processing, based on that the target meets a tracking requirement, the first image and the second image to determine trajectory information of the target; and controlling a pan-tilt to drive at least one of the first camera or the second camera to move based on the trajectory information.

19 Claims, 14 Drawing Sheets

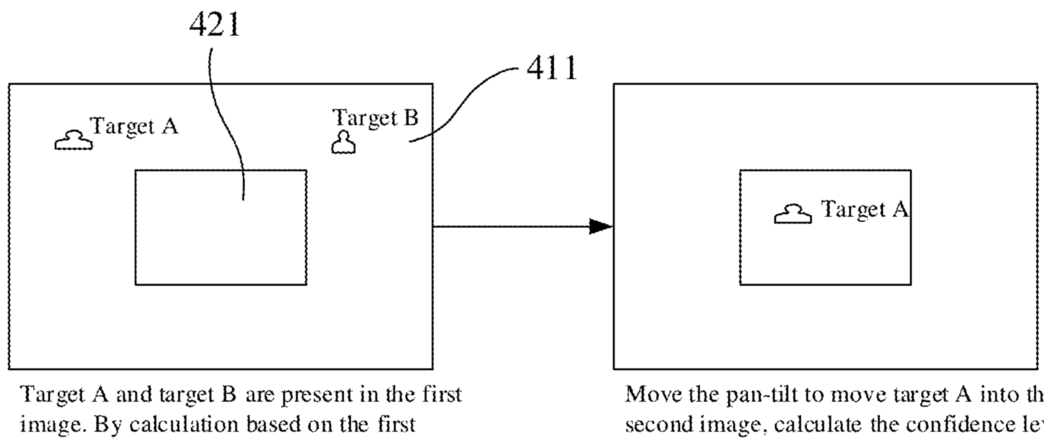

Target A and target B are present in the first image. By calculation based on the first image, target A has a confidence level of 60%, and target B has a confidence level of 50%

Move the pan-tilt to move target A into the second image, calculate the confidence level of target A to obtain 10% based on the second image, and determine that target A is not a tracking target

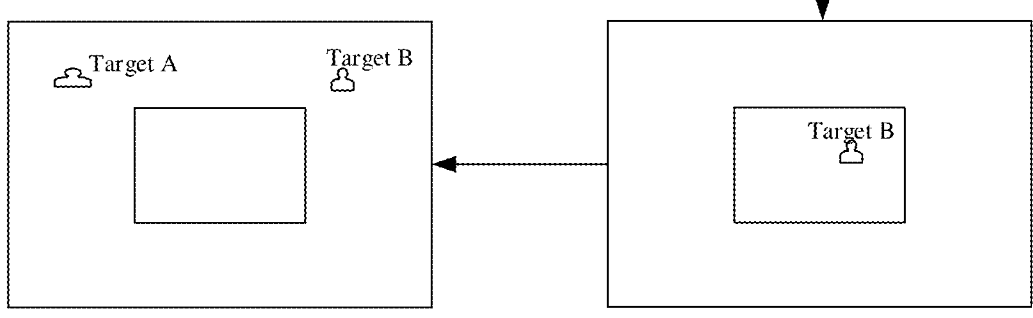

Move the pan-tilt back to its original position

Move the pan-tilt to move target B into the second image, calculate the confidence level of target B to obtain 90% based on the second image, and determine that target B is a tracking target

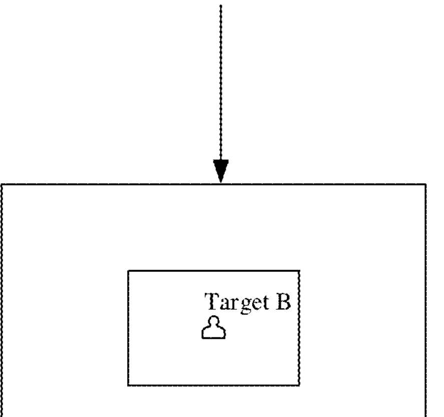

Move the pan-tilt so that target B is in the central position of the second image, and track target B

FIG. 6

OBJECT TRACKING USING CAMERAS

CROSS-REFERENCE TO RELATED APPLICATION

The present application claims priority to CN application Ser. No. 20/231,1086373.0, filed on Aug. 25, 2023, before the China National Intellectual Property Administration, which is incorporated herein by reference in its entirety.

TECHNICAL FIELD

The present application relates to the field of security devices, in particular to a tracking method for one or more cameras and/or other electronic device(s).

BACKGROUND

With the rapid development of technology, various intelligent electronic devices are being applied in various industries. In the field of security devices, people use security cameras to observe various scenes, which greatly meet people's security requirements and provide favorable guarantee for personal and property security. Images of a to-be-monitored scene are obtained by a camera, and then targets in the to-be-monitored scene are recognized, so as to observe the focused target specifically.

However, when some targets in the to-be-monitored scene are recognized, the information obtained by the camera about these targets can be insufficient, resulting in low accuracy of target recognition.

SUMMARY

The main technical problem solved by the present application is to provide an object tracking method for one or more cameras and/or other electronic device(s), which can improve the accuracy of target recognition.

To solve the above technical problem, the first technical solution adopted in the present application is to provide an object tracking method for a camera apparatus, including: obtaining current images of a to-be-monitored scenario (e.g., scene), where the current images include at least two images, each image is captured by a camera, the cameras include a first camera and a second camera, the field of view of the first camera is greater than the field of view of the second camera, the image captured by the first camera is a first image, and the image captured by the second camera is a second image: determining to-be-confirmed targets based on the first image: recognizing the to-be-confirmed targets that appears in the second image, to determine the to-be-confirmed target that meets a tracking requirement as a tracking target: processing the first image and the second image to determine trajectory information of the tracking target: and controlling a pan-tilt based on the trajectory information to drive the cameras to move, so that the tracking target is always in the second image.

To solve the above technical problem, the second technical solution adopted in the present application is to provide an electronic device, including a memory, a processor, and a communication circuit, where the memory stores a computer program, and the processor is configured to execute the computer program to implement the method provided in the first technical solution.

The beneficial effects of the present application are as follows: Different from the prior art, current images of a to-be-monitored scenario are obtained, where the current images include at least two images, each image is captured by a camera, the cameras include a first camera and a second camera, the field of view of the first camera is greater than the field of view of the second camera, the image captured by the first camera is a first image, and the image captured by the second camera is a second image: to-be-confirmed targets are determined based on the first image: the to-be-confirmed targets that appear in the second image are recognized, to determine the to-be-confirmed target that meets a tracking requirement as a tracking target: the first image and the second image are processed to determine trajectory information of the tracking target: and a pan-tilt is controlled based on the trajectory information to drive the cameras to move, so that the tracking target is always in the second image. When the computing power of a processor is limited, the second camera is configured to capture a target having a small area in the first image, where the target having the small area in the first image may have a large area in the second image. Therefore, the second image can provide sufficient information about the target, thereby improving the accuracy of target recognition and the tracking effect on the tracking target. The method recognizes a target without increasing the output resolution of the first camera or the computing power of the processor, and has a low requirement for the output resolution of the second camera, thereby reducing costs.

BRIEF DESCRIPTION OF THE DRAWINGS

FIG. 6 is a schematic flowchart of a recognition process in an example of the tracking method for the camera apparatus in the present application:

DETAILED DESCRIPTION

The following clearly and completely describes the technical solutions in the examples of the present application in conjunction with the accompanying drawings therein. Apparently, the described examples are only some of the examples of the present application, not all of them. Based on the examples of the present application, all other examples obtained by those skilled in the art without any creative effort shall fall within the scope of protection of the present application.

The inventor found through long-term research that images of a to-be-monitored scene are obtained by a camera apparatus, and then targets (e.g., target objects such as persons, animals, cars, natural objects) in the to-be-monitored scene are recognized, so as to observe the focused target specifically. However, when some targets in the to-be-monitored scenes are recognized, the information obtained by the camera apparatuses about these targets is insufficient, resulting in low accuracy of target recognition. In order to solve the above technical problem, the present application provides the following examples.

Figure 1:
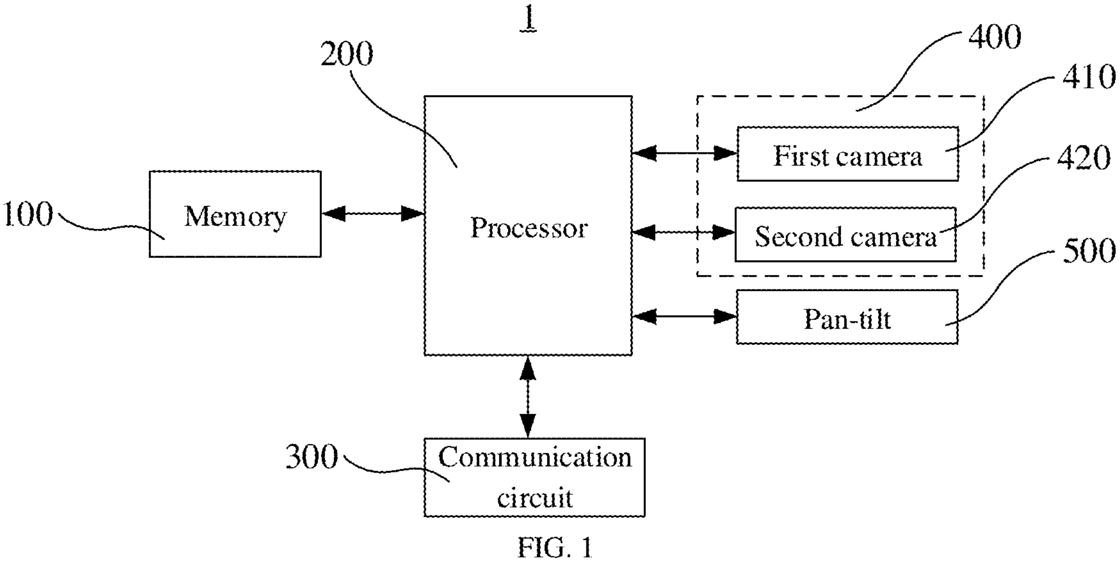
FIG. 1 is a schematic block diagram of a circuit structure of a camera in the present application.
Figure 2:
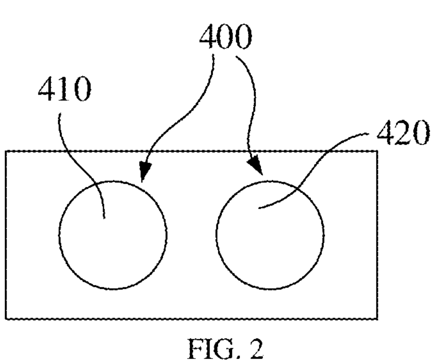
FIG. 2 is a schematic assembly diagram of cameras in the present application.

Cameras (e.g., security cameras) are commonly used in the fields of security, smart home, etc. As shown in FIG. 1 and FIG. 2, a camera apparatus 1 described in an example of a tracking method for a camera apparatus in the present application includes at least two cameras 400. The cameras 400 may be used for capturing a to-be-monitored scene to obtain current images of the to-be-monitored scene. A target (e.g., a target object) in the to-be-monitored scene can be confirmed and recognized from the current images of the to-be-monitored scene captured by the camera apparatus 1. For example, the current images obtained within a period of time may be analyzed to recognize a moving target. Recognizing the current images can determine whether the moving target is a person, object, or animal, etc. Further, a person can be set as a tracking target. If it is recognized and determined that the moving target is a person, the cameras 400 can be driven to move by a pan-tilt 500, so that the moving target is always in the current images, thereby achieving tracking of the tracking target. The camera apparatus 1 may be used for face recognition.

In some examples, the cameras 400 may be connected to power wires, and the power wires are used for supplying power to the cameras 400. In other examples, the camera apparatus 1 includes a battery module, and the battery module is used for supplying power to various electrical components of the camera apparatus 1, so that the camera apparatus 1 does not need to be connected to a power wire. The camera apparatus 1 may further include an infrared component (e.g., an infrared device). The infrared component may be used for receiving infrared radiation. When the person or object in the to-be-monitored scene radiates heat in a form of infrared radiation, the infrared component can sense the infrared radiation emitted by the person or object and changes in the infrared radiation, thereby sensing the movement of the person or object. Further, the infrared component may be a passive infrared sensor (PIR sensor).

The camera apparatus 1 may be coupled to a display apparatus in a wired or wireless manner. The current images captured by the camera apparatus 1 can be displayed on the display apparatus, making it convenient for a user to monitor the to-be-monitored scene. The display apparatus may be a smart phone, a tablet, etc. The display apparatus may be installed with an application (APP). The user can view the current images captured by the camera apparatus 1 through the application on the display apparatus. Further, the current images may include at least two images, which may be displayed with the same size. For example, the at least two images may be switched to display on the display apparatus. For another example, a display surface of the display apparatus may be divided into different regions, and the at least two images may be located in different regions of the display surface respectively.

Figure 3:
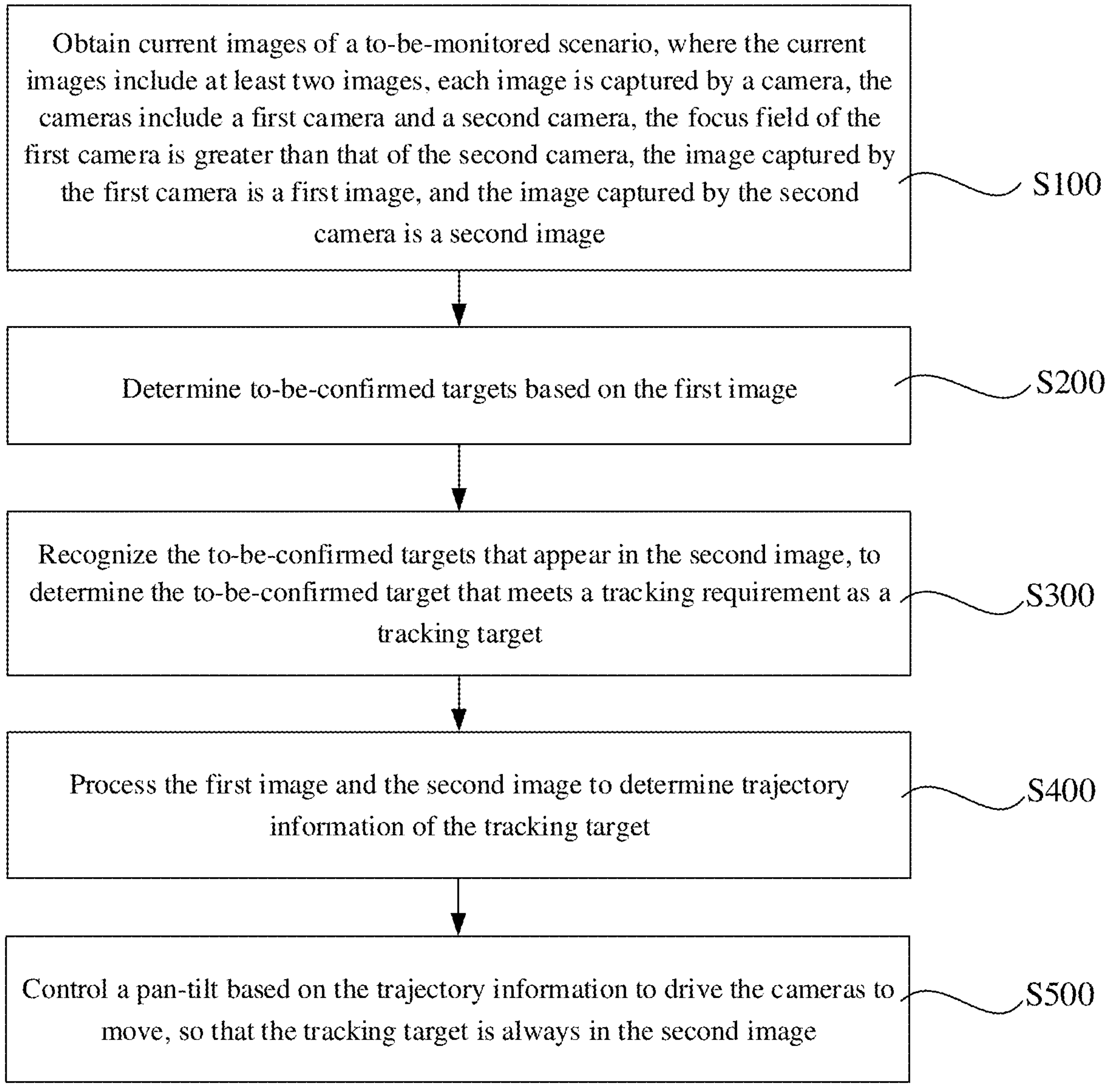
FIG. 3 is a schematic flowchart of an example of a tracking method for a camera apparatus in the present application.

As shown in FIG. 3, a tracking method described in an example of the tracking method for a camera apparatus in the present application includes:

S100: Obtain current images of a to-be-monitored scene, wherein the current images include at least two images, and each image is captured by a camera. The cameras include a first camera and a second camera, and the focus field (e.g., a field of view, an angle of view, a depth of field) of the first camera is greater than that of the second camera. The image captured by the first camera is a first image, and the image captured by the second camera is a second image.

S200: Determine to-be-confirmed targets based on the first image.

S300: Recognize the to-be-confirmed targets that appear in the second image, to determine the to-be-confirmed target that meets a tracking requirement as a tracking target.

S400: Process the first image and the second image to determine trajectory information of the tracking target.

S500: Control a pan-tilt (e.g., gimbal) based on the trajectory information to drive the cameras to move, so that the tracking target is always in the second image (e.g., for at least a predetermined period of time).

The to-be-monitored scene may refer to a region that needs to be observed, and a target that needs to be observed is present in the region and can enter or leave the region.

Figure 4:
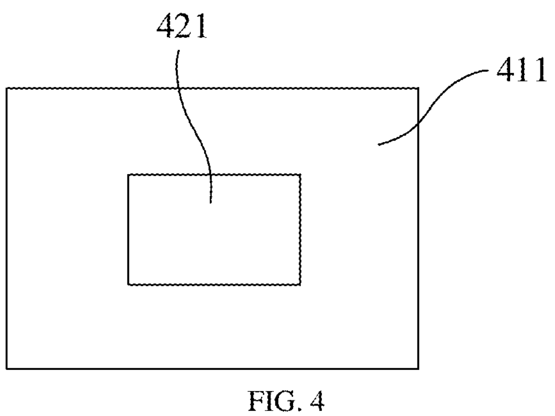
FIG. 4 is a schematic diagram showing a field-of-view relationship between a first image and a second image in the present application.

The camera apparatus 1 may include at least two cameras 400. Each camera 400 may be used for capturing the to-be-monitored scene to obtain a current image of the to-be-monitored scene. The at least two cameras 400 may include a first camera 410 and a second camera 420. The focus field of the first camera 410 is greater than that of the second camera 420, that is, the region of the to-be-monitored scene captured by the first camera 410 has a larger area than that captured by the second camera 420. As shown in FIG. 2 and FIG. 4, by configuring the assembly positions of the two cameras 400, the region of the to-be-monitored scene captured by the first camera 410 can cover that captured by the second camera 420, that is, the content of the first image 411 includes the content of the second image 421.

The focal length of the second camera 420 may be longer than that of the first camera 410. For example, the first camera 410 may have a wide-angle lens, and the region captured by the first camera 410 is the vicinity of the to-be-monitored scene, with a relatively large area. The second camera 420 may have a telephoto lens, so that the region captured by the second camera 420 is a local distant part of the to-be-monitored scene, with a relatively small area.

The image captured by the first camera 410 is the first image 411. The image captured by the second camera 420 is the second image 421. The first image 411 and the second image 421 can be displayed separately on the display apparatus. The output resolution of the camera 400 may be limited. For some targets with small areas in the first image 411, the information that the first image 411 can provide about the targets is limited, resulting in low accuracy of target recognition based on the first image 411 and poor tracking effect. For example, the target far from the camera apparatus 1 has a small area in the first image 411, which makes it difficult to determine whether the target is a person, object, or animal, making it difficult to determine and track a tracking target.

If the output resolution of the first camera 410 is increased, on the one hand, the cost of the camera 400 is increased, and on the other hand, the burden on the computing power of a processor 200 is increased, which may increase the cost of the processor 200. Specifically, the first image 411 needs to be input into an AI algorithm model to recognize the target in the first image 411, which requires sufficient computing power support from the processor 200. The higher the output resolution of the first camera 410, the more image information of the first image 411 and the larger the memory occupied thereby, and the higher the computing power requirements for the processor 200.

When the computing power of the processor 200 is limited, the second camera 420 is configured to capture a target having a small area in the first image 411, where the target having the small area in the first image 411 may have a large area in the second image 421. Therefore, the second image 421 can provide sufficient information about the target, thereby improving the accuracy of target recognition and the tracking effect on the tracking target. The second camera 420 is configured to improve the accuracy of target recognition and the tracking effect on tracking targets without increasing the output resolution of the first camera 410 or the computing power of the processor 200, thereby reducing costs. By configuring the second camera 420 to have a telephoto lens (e.g., long-focus lens), the requirement for the output resolution of the second camera 420 is relatively low. This is beneficial for the computing power of the processor 200 to meet requirements. By configuring the first camera 410 to have a wide-angle lens, the area of the region captured by the camera apparatus 1 is increased, thereby reducing the missed detection rate of target recognition.

The focal length of the second camera 420 is longer than that of the first camera 410, and the target far from the camera apparatus 1 has a smaller area in the first image 411 but has a larger area in the second image 421 (e.g., appear larger in the second image 421), so that the second image 421 can provide more information about the target. Recognizing the distant target based on the second image 421 can improve the accuracy of recognition on the distant target. Determining the trajectory information of the tracking target based on the second image 421 can improve the tracking effect on the tracking target.

Before recognizing the to-be-confirmed targets that appear in the second image 421, the following steps may be performed:

S301: Control the pan-tilt to drive the cameras to move, so that the to-be-confirmed targets outside the second image enter the second image.

Figure 5:
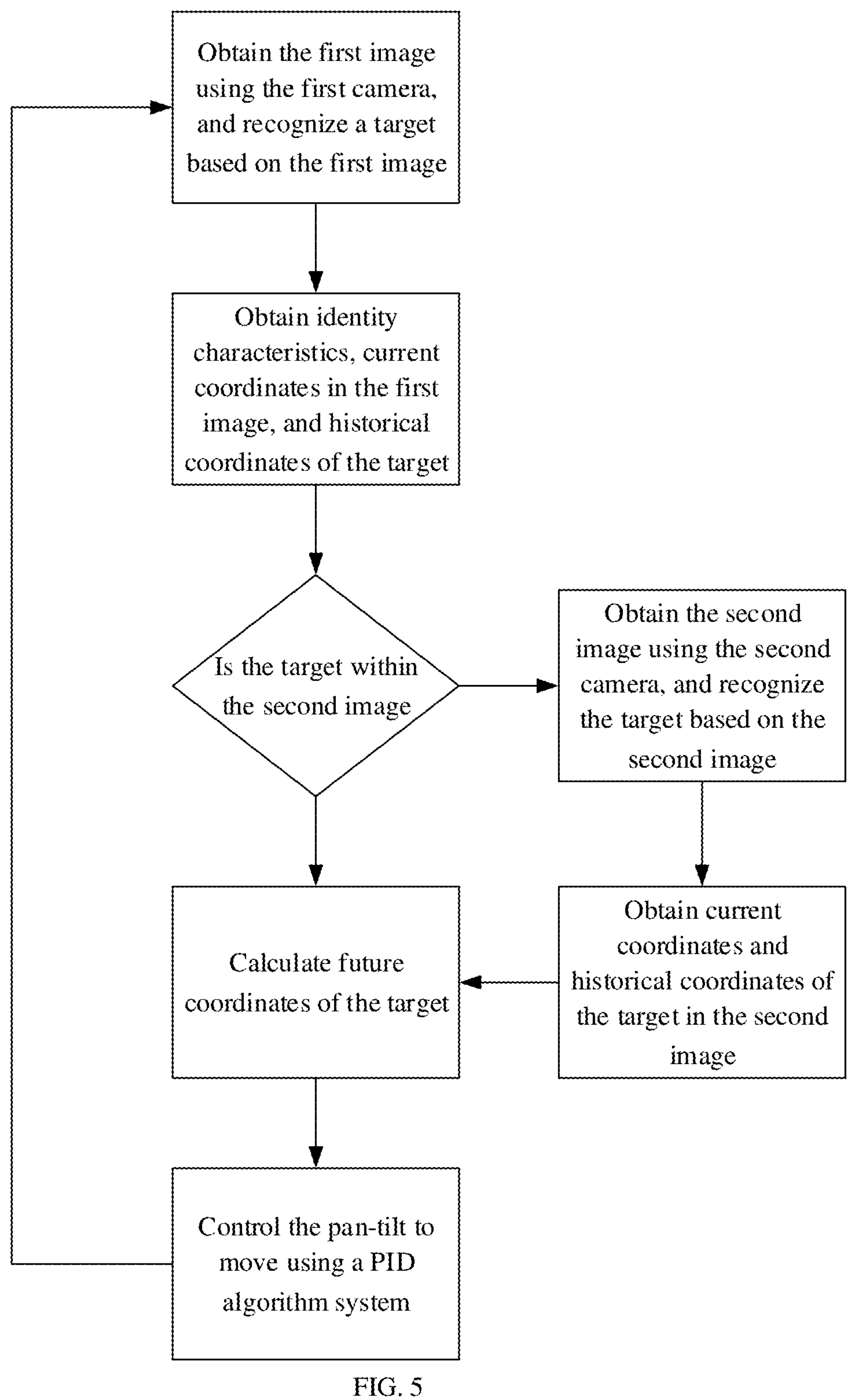
FIG. 5 is a schematic flowchart of another example of the tracking method for the camera apparatus in the present application.

As shown in FIG. 5, for those targets that are not in the second image 421, the pan-tilt 500 needs to be moved to move the targets into the second image 421. For those targets present in the second image 421, the pan-tilt 500 does not need to be moved, and these targets can be recognized and tracked based on the second image 421.

Current images of a to-be-monitored scene are obtained, where the current images include at least two images, each image is captured by a camera 400. The cameras 400 may include a first camera 410 and a second camera 420, and the focus field of the first camera 410 is greater than that of the second camera 420. The image captured by the first camera 410 is a first image 411, and the image captured by the second camera 420 is a second image 421. To-be-confirmed targets are determined based on the first image 411: and the to-be-confirmed targets that appear in the second image 421 are recognized, to determine the to-be-confirmed target that meets a tracking requirement as a tracking target. The first image 411 and the second image 421 are processed to determine trajectory information of the tracking target: and a pan-tilt 500 is controlled to drive the cameras 400 to move based on the trajectory information, so that the tracking target is always in the second image 421.

When the computing power of a processor 200 is limited, the second camera 420 is configured to capture a target having a small area in the first image 411, where the target having the small area in the first image 411 may have a large area in the second image 421. Therefore, the second image 421 can provide sufficient information about the target, thereby improving the accuracy of target recognition and the tracking effect on the tracking target. The method recognizes a target without increasing the output resolution of the first camera 410 or the computing power of the processor 200, and has a low requirement for the output resolution of the second camera 420, thereby reducing costs.

The following describes the example of the tracking method for the camera apparatus in the present application in detail.

S100: Obtain current images of a to-be-monitored scene, where the current images include at least two images, and each image is captured by a camera. The cameras may include a first camera and a second camera, and the focus field of the first camera is greater than that of the second camera. The image captured by the first camera is a first image, and the image captured by the second camera is a second image.

A region of the to-be-monitored scene captured by the first camera can cover the region captured by the second camera. For example, content of the first image includes content of the second image. When a target appears in the second image, the target may inevitably appear in the first image. In this case, the target is in a common view region of the first camera and the second camera, and the target can be observed through the first camera and the second camera together. When a target appears in the first image but not in the second image, the target is not in the common view region of the first camera and the second camera, and the target can be observed through the first camera.

The first camera and the second camera may be relatively fixed (e.g., the relative positions of the first camera and the second camera is fixed), so that a central position of the second image is kept at a central position of the first image. In other examples, the second image may be next to one side or corner of the first image within the first image.

The cameras may include a first camera and at least two second cameras, and each of the second cameras can capture a second image of the to-be-monitored scene. The second images captured by the different second cameras may be distributed at intervals within the first image.

The cameras include a first camera, a second camera, and a third camera. The third camera can capture the to-be-monitored scene to obtain a third image, and the focus field of the second camera is greater than that of the third camera.

The region of the to-be-monitored scene captured by the second camera has a larger area than that captured by the third camera. By adjusting the assembly positions of the cameras, the region of the to-be-monitored scene captured by the second camera can cover the region captured by the third camera. The content of the second image can include the content of the third image.

S200: Determine to-be-confirmed targets based on the first image.

Because the focus field of the first camera is greater than that of the second camera, the region captured by the first camera has a larger area. Recognizing targets based on the first image can reduce the missed detection rate of target recognition and improve the tracking effect. Some targets in the first image contain a lot of information, and correspondingly, the accuracy of recognition on these targets is high. Other targets in the first image contain less information, resulting in low accuracy of recognition. The targets with less information in the first image may be determined as to-be-confirmed targets for further recognition in subsequent steps, thereby improving the accuracy of recognition.

The determining to-be-confirmed targets based on the first image can include the following step:

S210: Recognize targets in the first image using a first algorithm model based on the first image.

The first algorithm model may be an artificial intelligence (AI) algorithm model, which has a function of recognizing targets. The first image can be input into the first algorithm model to recognize the targets in the first image.

The determining to-be-confirmed targets based on the first image can include the following step:

S220: Calculate a confidence level of each to-be-confirmed target based on the first image.

There may be a plurality of targets in the first image. The targets in the first image can be preliminarily recognized using the AI algorithm model based on the first image, to determine whether each target in the first image is a tracking target that needs attention and tracking. After recognizing the targets, the AI algorithm model can output the confidence levels corresponding to the targets. The confidence level can be used for indicating the reliability that the target is a tracking target. The higher the confidence level, the higher the likelihood that the target is a tracking target. For example, as shown in FIG. 6, there may be target A and target B in the first image, target A has a confidence level of 60%, and target B has a confidence level of 50%, indicating that target A is more likely to be a tracking target than target B.

The targets with less information in the first image can be recognized as to-be-confirmed targets, and each to-be-confirmed target is recognized based on the first image to obtain a confidence level of each to-be-confirmed target. In the subsequent steps, the to-be-confirmed targets outside the second image can be moved into the second image one by one in order of the confidence levels of the to-be-confirmed targets, so as to further recognize the to-be-confirmed targets. For example, as shown in FIG. 6, if the confidence level of target A is 10% and the confidence level of target B is 90% in the second image, it can be determined that target A is not a tracking target but target B is a tracking target.

The determining to-be-confirmed targets based on the first image can include the following steps:

S230: Calculate an area proportion of each target in the first image respectively.

S240: In response to the area proportions being less than or equal to a preset threshold, determining the targets with the area proportions less than or equal to the preset threshold as the to-be-confirmed targets.

The first image is captured by the first camera. Compared to the second image, the first image corresponds to a larger shooting field of view. For the same target, its area proportion in the second image is higher than that in the first image.

For some targets, their area proportions in the first image are too small to make it difficult to accurately recognize the targets, and the targets need to be in the second image for further recognition and confirmation using the second image. The preset threshold can be set, the targets with the area proportions less than or equal to the preset threshold are determined as to-be-confirmed targets, and then the to-be-confirmed targets are enabled to be in the second image. More details and information about the to-be-confirmed targets can be obtained in the second image, which is beneficial to accurate recognition on the to-be-confirmed targets.

For the targets with the area proportions greater than the preset threshold in the first image, sufficient information about the targets can be obtained in the first image, and the targets do not need to be moved to the second image for recognition.

S300: Recognize the to-be-confirmed targets that appear in the second image, to determine the to-be-confirmed target that meets a tracking requirement as a tracking target.

The to-be-confirmed targets obtained based on the first image contain less information, and therefore can be recognized based on the second image. For example, by controlling the pan-tilt to drive the cameras to move, each to-be-confirmed target can be moved into the second image, thereby obtaining more information about the to-be-confirmed targets and improving the accuracy of recognizing the to-be-confirmed targets as tracking targets.

The tracking requirement is a condition for determining the to-be-confirmed target as a tracking target. For example, if the tracking requirement is that the tracking target is a person, the to-be-confirmed target recognized as a person can be determined as a tracking target.

The recognizing the to-be-confirmed targets that appear in the second image can include the following step:

S310: Recognize the targets in the second image using a second algorithm model based on the second image.

The number of convolutional layers of the first algorithm model is less than that of the second algorithm model.

The second algorithm model is an AI algorithm model, which has a function of recognizing targets. The second image can be input into the second algorithm model to recognize the targets in the second image.

The convolutional model of the AI algorithm model has a plurality of layers, and the AI algorithm model can output distinctive features through the convolutional model. For example, the first layer of the convolutional model can recognize a contour of a target, and the second, third, or fourth layer of the convolutional model can recognize details of the target.

The first image is captured by the first camera. Compared to the second image, the shooting field of view corresponding to the first image is larger and fewer target details are captured therein. The second image is captured by the second camera. Compared to the first image, the shooting field of view corresponding to the second image is smaller and more target details are captured therein. Therefore, the first image can be recognized using the first algorithm model with fewer layers, and the second image can be recognized using the second algorithm model with more layers.

The second algorithm model has a higher standard for recognizing targets and a higher risk of over-fitting, leading to a higher risk of recognizing targets as non-targets erroneously. The first algorithm model has a lower standard for recognizing targets, leading to a higher risk of recognizing non-targets as targets erroneously. By using the first algorithm model with fewer convolutional layers to recognize the first image, targets in the first image can be preliminarily recognized, so the target recognition is relatively comprehensive and the missed detection rate can be reduced. By using the second algorithm model with more convolutional layers to recognize the second image, targets in the second image can be further recognized, which supplements and checks the preliminary recognition, thereby improving the accuracy of target recognition.

When the computing power of the processor is limited, it is difficult to implement detailed recognition on comprehensive targets. By using the first algorithm model for preliminary recognition on comprehensive targets and the second algorithm model for detailed recognition on to-be-confirmed targets, the computing power of the processor is reasonably allocated and utilized, which is beneficial to simultaneously improving the comprehensiveness and accuracy of target recognition.

Further, the first algorithm model and the second algorithm model are cropped separately from the same AI algorithm model. The first algorithm model and the second algorithm model can be finely adjusted by the same AI algorithm model in terms of detection weights, so that the first algorithm model and the second algorithm model focus on breadth and depth respectively.

The controlling the pan-tilt to drive the cameras to move so that the to-be-confirmed targets outside the second image enter the second image can include the following step:

S320: Control the pan-tilt to drive the cameras to move so that the to-be-confirmed targets outside the second image sequentially enter the second image in descending order of confidence levels, and perform recognition until the tracking target is obtained.

After recognizing the to-be-confirmed targets, the AI algorithm model can output the confidence levels corresponding to the to-be-confirmed targets. The confidence level can be used for indicating the reliability that the to-be-confirmed target is a tracking target. The higher the confidence level, the higher the likelihood that the to-be-confirmed target is a tracking target.

The to-be-confirmed targets are located in the second image in descending order of the confidence levels. The to-be-confirmed targets can be sequentially recognized based on the second image in descending order of the confidence levels, which is beneficial to quickly determining the tracking target. For example, as shown in FIG. 6, there may be target A and target B in the first image, target A has a confidence level of 60%, and target B has a confidence level of 50%. The pan-tilt is controlled to drive the cameras to move, so that target A and target B enter the second image and are recognized sequentially.

The recognizing the to-be-confirmed targets that appear in the second image, to determine the to-be-confirmed target that meets a tracking requirement as a tracking target can include the following steps:

S330: Obtain identity characteristics of the to-be-confirmed targets.

S340: Perform comparative analysis on the identity characteristics and pre-stored identity characteristics to determine the tracking target.

Figure 7:
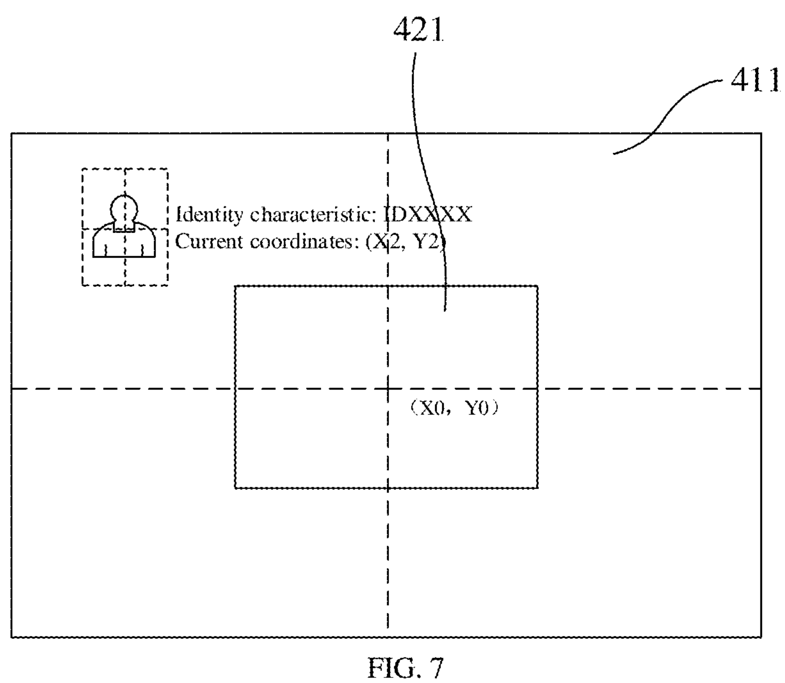
FIG. 7 is a schematic diagram of obtaining identity characteristics in an example of the tracking method for the camera apparatus in the present application.

The tracking requirement may be that the identity characteristics of a to-be-confirmed target are consistent with the pre-stored identity characteristics. As shown in FIG. 7, the identity characteristics of a to-be-confirmed target can be obtained by recognizing the to-be-confirmed target. After the comparative analysis is performed on the identity characteristics and the pre-stored identity characteristics, if the identity characteristics of a to-be-confirmed target are consistent with the pre-stored identity characteristics, the to-be-confirmed target is determined as the tracking target (e.g., a type of the target can be determined).

The identity characteristics include a contour shape and biological characteristics. The pre-stored identity characteristics include a pre-stored contour shape and pre-stored biological characteristics.

Performing comparative analysis on the identity characteristics and pre-stored identity characteristics to determine the tracking target can include the following steps: S341: Obtain the contour shape of the to-be-confirmed target.

S342: In response to the contour shape being the pre-stored contour shape, further obtain the biological characteristics of the to-be-confirmed target.

S343: In response to the biological characteristics being the pre-stored biological characteristics, determine the to-be-confirmed target as the tracking target.

The contour shape of the to-be-confirmed target is compared with the pre-stored contour shape. When the contour shape of the to-be-confirmed target is consistent with the pre-stored contour shape, it indicates the possibility that the to-be-confirmed target is a tracking target. Then, the biological characteristics of the to-be-confirmed target are further obtained. The biological characteristics are compared with the pre-stored biological characteristics. When the biological characteristics are consistent with the pre-stored biological characteristics, it indicates that the to-be-confirmed target is the tracking target.

When the target is an animal, the biological characteristics may behavior characteristics of the animal, such as posture and movement of the animal. When the target is a person, the biological characteristics may include fingerprints, face image, iris, palm prints, etc. of the person and posture and movement of the person. Comparing the biological characteristics with the pre-stored biological characteristics is beneficial to maintaining a high level of recognition accuracy. Compared to extracting the biological characteristics of a to-be-confirmed target, extracting the contour shape of the to-be-confirmed target is simpler and faster. Determining the contour shape before determining the biological characteristics is beneficial to improving recognition efficiency.

S400: Process the first image and the second image to determine trajectory information of the tracking target.

Because the tracking target may be constantly moving, processing the first image to determine trajectory information of the tracking target can obtain a more complete trajectory of the tracking target. Because the tracking target has a larger area and more information in the second image, processing the second image to determine trajectory information of the tracking target is more accurate. Determining the trajectory information of the tracking target is conducive to continuously tracking the tracking target and reducing the probability of losing the tracking target.

The processing the first image and the second image to determine trajectory information of the tracking target can include the following steps:

S410: Determine current coordinates of the tracking target and historical coordinates thereof before a preset interval time.

S420: Calculate a movement vector using the historical coordinates and the current coordinates.

S430: Calculate future coordinates of the tracking target using the movement vector and the current coordinates.

Figure 8:
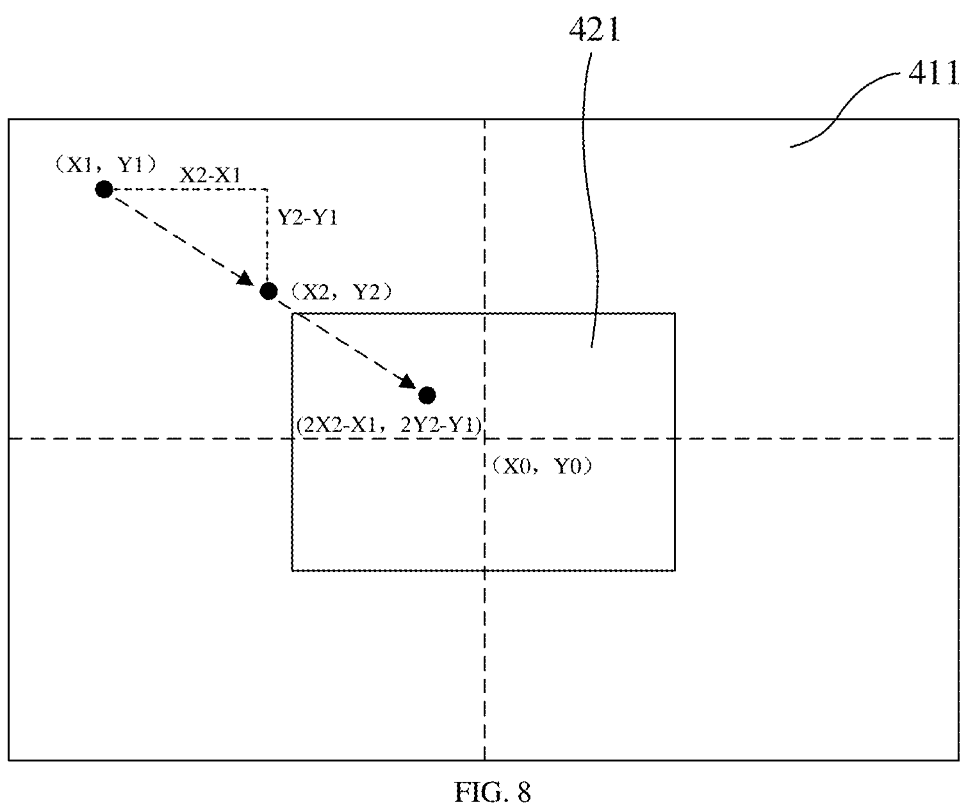
FIG. 8 is a schematic diagram of obtaining trajectory information in an example of the tracking method for the camera apparatus in the present application.

As shown in FIG. 8, the trajectory information of the tracking target may include historical trajectory information and future trajectory information. The historical trajectory information includes the historical coordinates of the tracking target, and the future trajectory information includes the future coordinates of the tracking target. The current coordinates and historical coordinates of the tracking target can be obtained from the first image and the second image and can be considered known. The future coordinates of the tracking target can be predicted through the current coordinates and historical coordinates of the tracking target. Specifically, the movement vector can be calculated using the current coordinates and historical coordinates of the tracking target, and then the future coordinates of the tracking target can be calculated using the movement vector and the current coordinates. For example, an image has 10 frames per second, and the preset interval time is the time corresponding to one frame of the image. The historical coordinates of the tracking target obtained from the previous frame are (X1, Y1), the current coordinates are (X2, Y2), the movement vector is (X2-X1, Y2-Y1), and the future coordinates of the tracking target in the next frame can be calculated as (2X2-X1, 2Y2-Y1).

Before determining current coordinates of the tracking target and historical coordinates thereof before a preset interval time, the method further includes:

S411: Obtain position coordinates of the tracking target at any current position.

S412: In response to at least some of the position coordinates of the tracking target being outside the second image, calculate the current coordinates of the tracking target and the historical coordinates thereof before the preset interval time with coordinates of the first image as reference coordinates.

Figure 9:
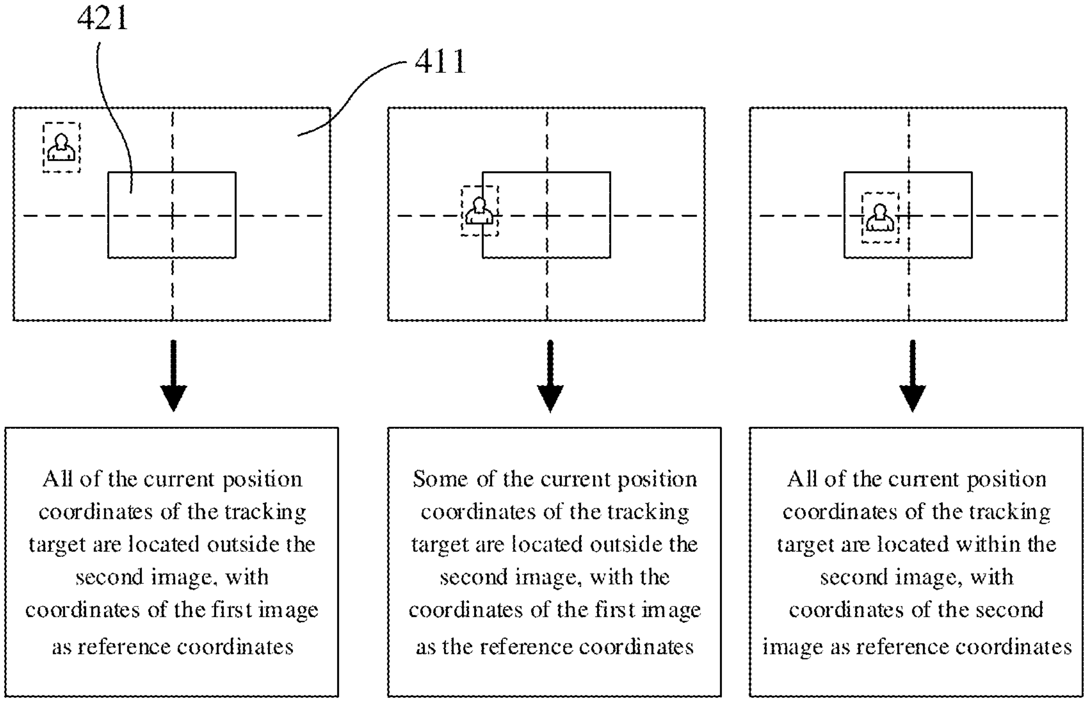
FIG. 9 is a schematic diagram of a method for determining reference coordinates in an example of the tracking method for the camera apparatus in the present application.

As shown in FIG. 9, at least some of the position coordinates of the tracking target being outside the second image indicates that at least a portion of the tracking target is located outside the second image. Therefore, more complete coordinate information of the tracking target can be obtained from the coordinates of the first image as reference coordinates, so that the obtained current coordinates and historical coordinates of the tracking target are more accurate.

Figure 10:
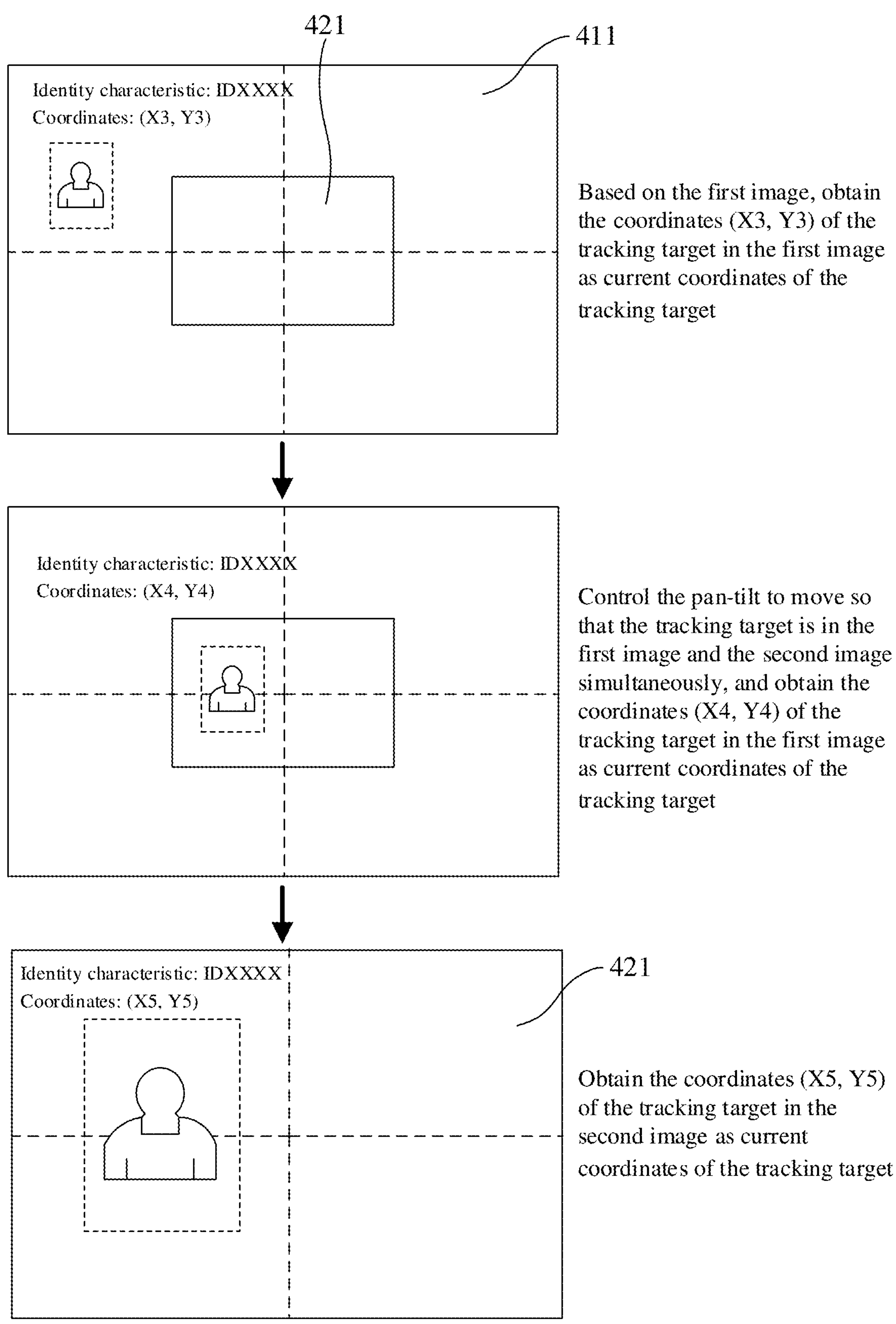
FIG. 10 is a schematic diagram of a method for determining current coordinates in an example of the tracking method for the camera apparatus in the present application.

As shown in FIG. 10, in some examples, if at least some of the position coordinates of the tracking target are outside the second image, the pan-tilt is controlled to move, so that all current position coordinates of the tracking target are within the second image. For example, coordinates (X3, Y3) of the tracking target in the first image are first obtained based on the first image as current coordinates of the tracking target, then the pan-tilt is controlled to move so that the tracking target is in both the first image and the second image to obtain coordinates (X4, Y4) of the tracking target in the first image as current coordinates of the tracking target, and finally coordinates (X5, Y5) of the tracking target in the second image are obtained as current coordinates of the tracking target.

Before determining current coordinates of the tracking target and historical coordinates thereof before a preset interval time, the method further includes:

S413: In response to all of the current position coordinates of the tracking target being located within the second image, calculate the current coordinates of the tracking target relative to the second image and the historical coordinates thereof before the preset interval time with coordinates of the second image as reference coordinates.

As shown in FIG. 9, all current position coordinates of the tracking target being located within the second image indicates that the tracking target is completely within the second image. The coordinates of the second image as reference coordinates can make the obtained current coordinates and historical coordinates of the tracking target more precise and accurate.

S500: Control a pan-tilt based on the trajectory information to drive the cameras to move, so that the tracking target is always in the second image (e.g., for at least a predetermined period of time).

When the tracking target is in the second image, in order to continuously track the tracking target and reduce the probability of losing the tracking target, the pan-tilt can be controlled based on the trajectory information to drive the cameras to move, so that the shooting fields of view of the cameras follow the movement of the tracking target, which enables the tracking target always in the second image.

Controlling the pan-tilt based on the trajectory information to drive the cameras to move enables the shooting fields of view of the cameras to follow the tracking target, and the pan-tilt is adjusted in a timely manner to move according to the future trajectory of the tracking target. The pan-tilt is more sensitive to the movement changes of the tracking target and responds more promptly, which results in smaller fluctuations in pan-tilt movement and reduces the risk of camera shake caused by rapid changes in pan-tilt movement, making the tracking process more stable and reliable.

The controlling the pan-tilt based on the trajectory information to drive the cameras to move can include the following steps:

S510: Calculate a movement state of the pan-tilt using the trajectory information and a proportional-integral-derivative (PID) algorithm system.

S520: Control the pan-tilt to move according to the movement state, so that the pan-tilt drives the camera to move.

Figure 11:
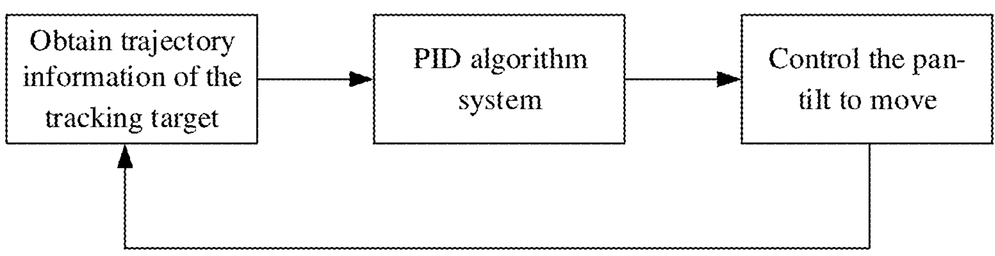
FIG. 11 is a schematic flowchart of closed-loop control on pan-tilt movement in an example of the tracking method for the camera apparatus in the present application.

The trajectory information of the tracking target can be obtained from the current image. As shown in FIG. 11, the trajectory information of the tracking target can be input into the PID algorithm system. The PID algorithm system can accurately adjust the movement state of the pan-tilt according to the trajectory information of the tracking target, so that the movement state of the pan-tilt matches the trajectory information of the tracking target.

Figure 12:
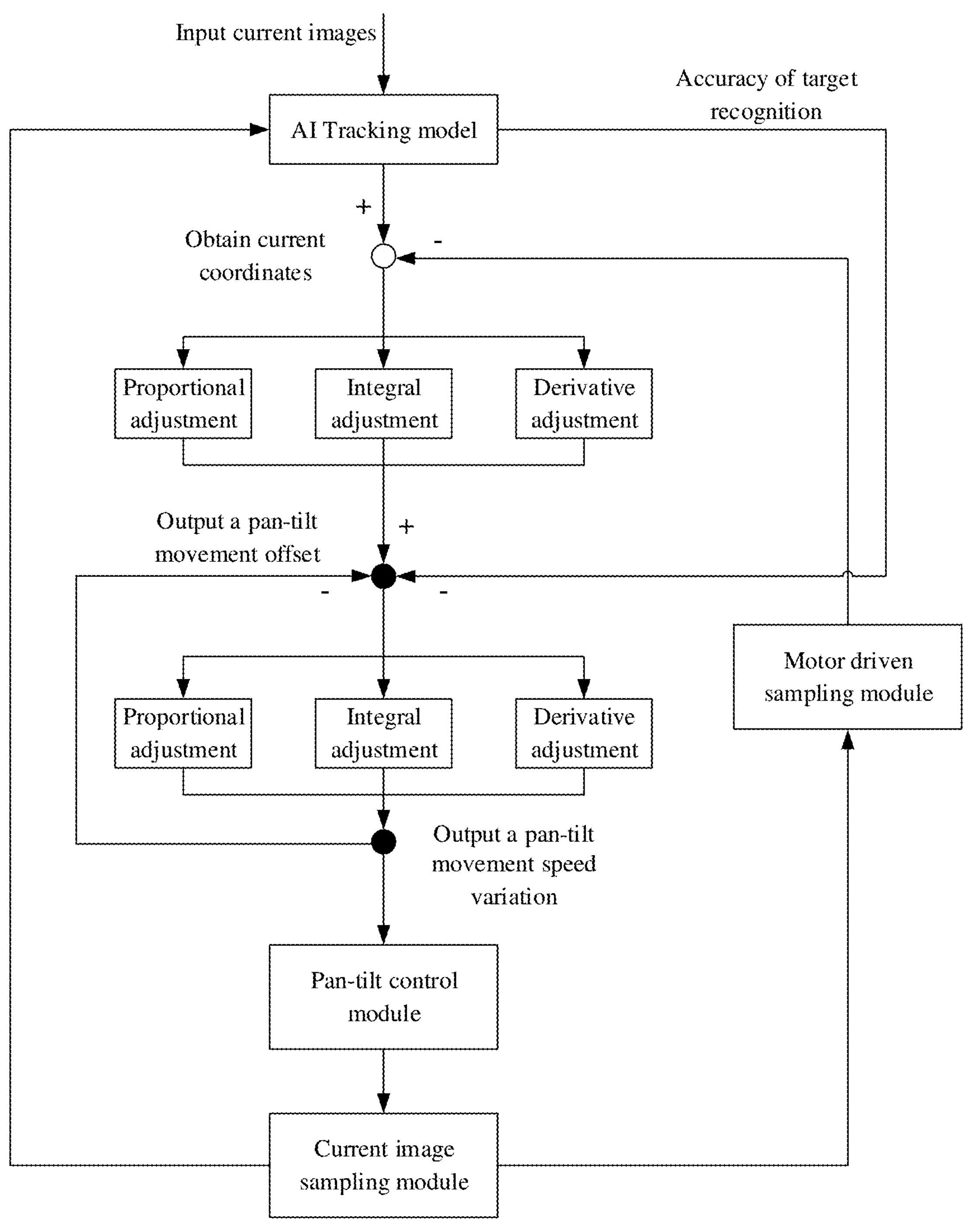
FIG. 12 is a schematic working diagram of a proportional-integral-derivative (PID) algorithm system in an example of the tracking method for the camera apparatus in the present application.

As shown in FIG. 12, the PID algorithm system can control the movement state of the pan-tilt to match the trajectory information of the tracking target according to a PID algorithm. The PID algorithm can include proportional adjustment, integral adjustment, and derivative adjustment.

Specifically, after obtaining the coordinates of the tracking target in the current image, the PID algorithm system can output relevant parameters of the movement state of the pan-tilt through the PID algorithm, and the pan-tilt moves according to the relevant parameters of the movement state, so that the tracking target can move towards the center of the current image. Further, after obtaining the coordinates of the tracking target in the second image, the PID algorithm system can output relevant parameters of the movement state of the pan-tilt through the PID algorithm, and the pan-tilt moves according to the relevant parameters of the movement state, so that the tracking target can be in the center of the second image.

As shown in FIG. 12, when the pan-tilt moves according to the calculated movement state, the camera moves synchronously with the pan-tilt. The current image constantly changes with the movement of the pan-tilt, the trajectory information of the tracking target also constantly changes, and a new movement state of the pan-tilt is calculated accordingly. In this way, the movement state, current image, and trajectory information of the pan-tilt form a closed loop, thereby improving the sensitivity of control on pan-tilt movement, reducing the fluctuation amplitude of pan-tilt movement, and thus making the movement state of the pan-tilt more stable.

Figure 13:
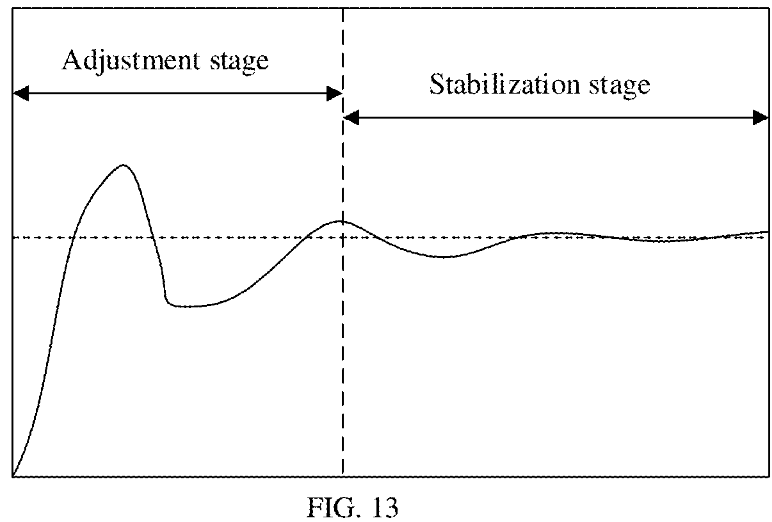
FIG. 13 is a schematic diagram of a fluctuation amplitude change of pan-tilt movement in an example of the tracking method for the camera apparatus in the present application.

Specifically, as shown in FIG. 13, the movement process of the pan-tilt tracking the tracking target can be divided into an adjustment stage and a stabilization stage. In the adjustment stage, the fluctuation amplitude of pan-tilt movement is relatively large, and the movement of the pan-tilt can quickly enter the stabilization stage using the tracking method. After entering the stabilization phase, the fluctuation amplitude of pan-tilt movement is small, making the movement state of the pan-tilt more stable.

The movement state includes movement displacement and movement speed variation, the PID algorithm system includes a displacement PID unit and a speed PID unit, and calculating a movement state of the pan-tilt using the trajectory information and a PID algorithm system can refer to the following step included after step S510:

S511: Calculate the movement displacement using the displacement PID unit based on the trajectory information.

The movement displacement indicates how much distance the pan-tilt needs to move to maximize the tracking target in the central position (X0, YO) of the second image. The PID algorithm system may include a displacement PID unit, which can output the movement displacement of the pan-tilt through the proportional-integral-derivative algorithm.

The calculating the movement displacement using the displacement PID unit can include the following steps:

S5111: Calculate initial movement displacement using the displacement PID unit.

S5112: Input the current image into a tracking algorithm model to obtain a current target recognition rate.

S5113: Obtain a first displacement compensation value corresponding to the current target recognition rate, and calculate the movement displacement using the first displacement compensation value and the initial movement displacement.

The current target recognition rate represents the accuracy of target recognition based on the current image. As the pan-tilt drives the camera to move, the current image is updated in real time, and the accuracy of target recognition varies based on different current images. Therefore, controlling the movement of the pan-tilt should also consider the variable of current target recognition rate, so that the current target recognition rate is kept at a high level in the process that the pan-tilt drives the camera to move.

According to the distance between the tracking target and the central position of the second image, the displacement PID unit can calculate the initial movement displacement. The distance between the tracking target and the central position of the second image can refer to the distance between the geometric center of the tracking target in the second image and the central position of the second image. Then, the initial movement displacement can be corrected using the first displacement compensation value corresponding to the current target recognition rate, so as to obtain the movement displacement.

In some examples, if the obtained current target recognition rate decreases in the process of movement of the pan-tilt according to the initial movement displacement, the pan-tilt can obtain the first displacement compensation value corresponding to the current target recognition rate, and correct the initial movement displacement using the first displacement compensation value to obtain the movement displacement.

In this way, the current image, the current target recognition rate, and the movement displacement of the pan-tilt can form a closed loop, thereby improving the sensitivity of control on pan-tilt movement, reducing the fluctuation amplitude of pan-tilt movement, and thus making the movement state of the pan-tilt more stable.

Further, the tracking algorithm model may be an AI tracking model. Based on the current image, the AI tracking model can also output the distance between the tracking target and the central position of the second image.

The calculating the movement displacement using the displacement PID unit can include the following steps:

S5114: Obtain a current movement speed of the pan-tilt.

S5115: Obtain a second displacement compensation value corresponding to the current movement speed, and correct the movement displacement using the second displacement compensation value.

Because the pan-tilt continually drives the camera to move, the displacement movement may drift. The movement displacement can be corrected using the second displacement compensation value corresponding to the current movement speed of the pan-tilt.

The current movement speed of the pan-tilt is affected by a historical movement speed variation, the historical movement speed variation is calculated based on historical displacement, and the current movement speed of the pan-tilt can further be used to correct the movement displacement. In this way, the control on the current movement speed of the pan-tilt and the control on the movement displacement can form a closed loop, thereby improving the sensitivity of control on pan-tilt movement, reducing the fluctuation amplitude of pan-tilt movement, and thus making the movement state of the pan-tilt more stable.

S512: Calculate the movement speed variation using the speed PID unit based on the movement displacement.

The movement speed variation indicates how much speed needs to be increased or decreased when the pan-tilt moves, so as to drive the camera to maintain an acceptable movement speed and match the movement speed of the camera driven by the pan-tilt with the movement speed of the tracking target. The PID algorithm system may include a speed PID unit, which can output the movement speed variation of the pan-tilt through the PID algorithm. The PID algorithm is based on the following formulas:

$$pos(k) = K_{p1}(e(k) - e(k-1)) + K_{i1}\sum_{i=1}^{k} e(i)\Delta(t) + K_{d1}\frac{e(k) - e(k-1)}{\Delta t}$$

$$\text{speed}(k) = K_{p2}(s(k) - s(k-1)) + K_{i2}\sum_{i=1}^{k} s(i)\Delta(t) + K_{d2}\frac{s(k) - s(k-1)}{\Delta(t)}.$$

Here, speed(k)=pos(k)*C*Z. pos (k) can be used for calculating a movement offset of the pan-tilt, and speed (k) can be used for calculating the movement speed variation of the pan-tilt. C is a constant, representing a condition that the distance corresponding to the movement displacement of the pan-tilt in the current image is completed by the tracking target within 1 second, that is, a speed of the tracking target in the current image. Parameter Z represents a confidence level of target recognition in the current image, with a confidence range of [0, 1].

The controlling the pan-tilt to move according to the movement state can include the following:

S521: Control the pan-tilt to move according to the movement displacement and the movement speed variation.

After obtaining the coordinates of the tracking target in the second image, the PID algorithm system can output the movement displacement and movement speed variation of the pan-tilt through the PID algorithm, and the pan-tilt moves according to the movement displacement and the movement speed variation to enable the tracking target in the central position of the second image.

Figure 14:
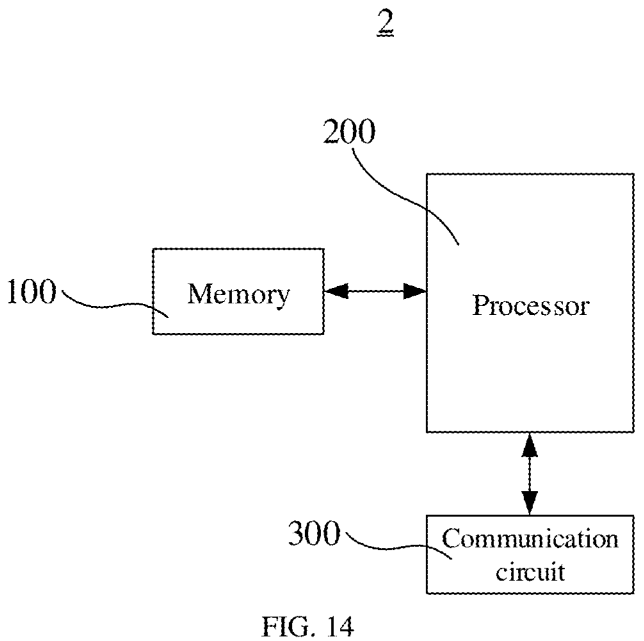
FIG. 14 is a schematic block diagram of a circuit structure of an example of an electronic device in the present application.

As shown in FIG. 14, an electronic device 2 described in an example of the present application includes a memory 100, a processor 200, and a communication circuit 300. The memory 100 stores a computer program, and the processor 200 is configured to execute the computer program to implement the method described in the example of the tracking method for the camera apparatus 1.

The processor 200 is configured to control the operation of the electronic device 2, and the processor 200 may also be referred to as a CPU (Central Processing Unit). The processor 200 may be an integrated circuit chip having a signal processing capability. The processor 200 may also be a general-purpose processor, a digital signal processor (DSP), an application-specific integrated circuit (ASIC), a field programmable gate array (FPGA) or other programmable logic devices, a discrete gate or transistor logic device, or a discrete hardware component. The general-purpose processor may be a microprocessor, or the processor may be any conventional processor or the like.

The processor 200 can support functions such as streaming, streaming media compression, and packet splitting. The processor 200 also supports AI algorithm processing, thereby supporting the method described in the example of the tracking method for the camera apparatus 1.

The memory 100 is configured to store a computer program, and may be an RAM, an ROM, or other types of storage devices. Specifically, the memory 100 may include one or more computer-readable storage media, which may be non-transient (e.g., non-transitory). The memory 100 may further include a high-speed random access memory and a non-volatile memory, such as one or more disk storage devices or flash storage devices. In some examples, the non-transient computer-readable storage medium in the memory 100 is used for storing at least one piece of program code.

The electronic device 2 can transmit data with other electronic products through the communication circuit 300. The communication circuit 300 can achieve wireless communication or wired communication.

In some examples, the electronic device 2 further includes a display apparatus (e.g., a TV, a smart phone, a monitor, a tablet) and a camera apparatus 1. The camera apparatus 1 sends captured images to the processor 200, and the processor 200 can send data to the display apparatus.

The processor 200 may send data to the display apparatus through a server or cloud server.

The electronic device 2 may be specifically a computer host or server.

The electronic device 2 may include a camera apparatus 1. The camera apparatus 1 may include at least two cameras 400, the at least two cameras 400 include a first camera 410 and a second camera 420, the focus field of the first camera 410 is greater than that of the second camera 420, and the first camera 410 and the second camera 420 are relatively fixed.

The camera apparatus 1 may include a memory 100, a processor 200, and a communication circuit 300. The memory 100 stores a computer program, and the processor 200 is configured to execute the computer program to implement the method described in the example of the tracking method for the camera apparatus 1 of the present application.

By relatively fixing the first camera 410 and the second camera 420, the first camera 410 and the second camera 420 can move synchronously.

The camera apparatus 1 may include a pan-tilt 500, and the pan-tilt 500 is used for driving the first camera 410 and the second camera 420 to move synchronously. The pan-tilt 500 can be used for mounting and fixing the camera apparatus 1. The pan-tilt 500 can be controlled to move and rotate.

To sum up, in this example, when the computing power of the processor is limited, the second camera is configured to capture a target having a small area in the first image, where the target having the small area in the first image may have a large area in the second image. Therefore, the second image can provide sufficient information about the target, thereby improving the accuracy of target recognition and the tracking effect on the tracking target. The second camera is configured to improve the accuracy of target recognition and the tracking effect on tracking targets without increasing the output resolution of the first camera or the computing power of the processor, thereby reducing costs.

Described above are only the examples of the present application, and the patent scope of the patent application is not limited thereto. Any equivalent structure or equivalent process transformation made using the description and accompanying drawings of the present application, directly or indirectly applied in other related technical fields, is also included in the scope of patent protection of the present application.

What is claimed is:

1. An object tracking method, comprising:

obtaining, using a first camera, a first image of a scene;

obtaining, using a second camera, a second image of the scene, wherein a field of view of the first camera is greater than a field of view of the second camera;

determining a target based on the first image;

determining that the target is not in the second image;

determining, based on the second image, that the target meets a tracking requirement;

processing, based on that the target meets a tracking requirement, the first image and the second image to determine trajectory information of the target;

controlling, based on that the target is not in the second image, a pan-tilt to drive at least the second camera to move based on the trajectory information; and obtaining, using the second camera, a third image that comprises the target.

2. The object tracking method according to claim 1, wherein a region of the scene captured by the first camera covers a region of the scene captured by the second camera.

3. The object tracking method according to claim 1, wherein the determining the target comprises:

recognizing targets in the first image using a first algorithm model, and the method further comprises recognizing the target in the third image using a second algorithm model, wherein a number of convolutional layers of the first algorithm model is less than a number of convolutional layers of the second algorithm model.

4. The object tracking method according to claim 3, wherein the determining the target comprises calculating a confidence level of each of a plurality of targets based on the first image; and the controlling the pan-tilt comprises controlling the pan-tilt to drive the first camera and the second camera to move so that the plurality of targets outside the second image sequentially enter the second image in descending order of confidence levels, and performing recognition until the target is obtained in the third image.

5. The object tracking method according to claim 1, further comprising:

obtaining identity characteristics of the target; and comparing the identity characteristics and pre-stored identity characteristics to determine a type of the target.

6. The object tracking method according to claim 5, wherein:

the identity characteristics comprise a contour shape and biological characteristics;

the pre-stored identity characteristics comprise a pre-stored contour shape and pre-stored biological characteristics; and the comparing comprises:

obtaining a contour shape of the target;

in response to the contour shape matching the pre-stored contour shape, obtaining biological characteristics of the target; and in response to the biological characteristics matching the pre-stored biological characteristics, determining the type of the target.

7. The object tracking method according to claim 1, wherein the determining the target comprises:

calculating a respective area proportion of each of a plurality of targets in the first image; and determining, based on that the area proportion of the target being less than or equal to a preset threshold, the target to be further captured by the second camera.

8. The object tracking method according to claim 1, wherein the processing the first image and the second image to determine the trajectory information comprises:

determining current coordinates of the target and historical coordinates of the target before a preset interval time;

calculating a movement vector using the historical coordinates and the current coordinates; and calculating future coordinates of the target using the movement vector and the current coordinates, wherein the trajectory information comprises the future coordinates of the target.

9. The object tracking method according to claim 8, wherein the processing the first image and the second image to determine the trajectory information comprises:

obtaining position coordinates of the target at a current position; and in response to at least some of the position coordinates of the target being outside the second image, calculating the current coordinates of the target and the historical coordinates of the target before the preset interval time based on coordinates of the first image.

10. The object tracking method according to claim 8, wherein the processing the first image and the second image to determine the trajectory information comprises: obtaining position coordinates of the target at a current position; and in response to all of the position coordinates of the target being located within the second image, calculating the current coordinates of the target relative to the second image and the historical coordinates of the target before the preset interval time based on coordinates of the second image.

11. The object tracking method according to claim 1, wherein the controlling the pan-tilt comprises:

calculating a movement state of the pan-tilt using the trajectory information and a proportional-integral-derivative (PID) algorithm system; and controlling the pan-tilt to move according to the movement state.

12. The object tracking method according to claim 11, wherein:

the movement state comprises movement displacement and movement speed variation;

the PID algorithm system comprises a displacement PID unit and a speed PID unit;

the calculating the movement state of the pan-tilt comprises:

calculating the movement displacement using the displacement PID unit based on the trajectory information; and calculating the movement speed variation using the speed PID unit based on the movement displacement; and the controlling the pan-tilt to move according to the movement state comprises:

controlling the pan-tilt to move according to the movement displacement and the movement speed variation.

13. The object tracking method according to claim 12, wherein the calculating the movement displacement using the displacement PID unit comprises:

calculating initial movement displacement using the displacement PID unit;

inputting the first image and the second image into a tracking algorithm model to obtain a current target recognition rate; and obtaining a first displacement compensation value corresponding to the current target recognition rate, and calculating the movement displacement using the first displacement compensation value and the initial movement displacement.

14. The object tracking method according to claim 12, wherein the calculating the movement displacement using the displacement PID unit comprises:

obtaining a current movement speed of the pan-tilt; and obtaining a second displacement compensation value corresponding to the current movement speed, and correcting the movement displacement using the second displacement compensation value.

15. The object tracking method according to claim 1, further comprising:

determining, based on a central position of the second image being at a central position of the first image, or the second image is next to one side or corner of the first image within the first image, a relative position of the first camera and the second camera; and maintaining the relative position.

16. The object tracking method according to claim 1, wherein a focal length of the second camera is greater than a focal length of the first camera.

17. The object tracking method according to claim 1, wherein the tracking requirement includes determining a type of the target to be a person.

18. An object tracking system, comprising:

a first camera configured to capture a first image of a scene;

a second camera configured to capture a second image of a scene, wherein a field of view of the first camera is greater than a field of view of the second camera;

a pan-tilt; and a computing device comprising:

one or more processors; and memory storing instructions that, when executed by the one or more processors, cause the computing device to:

determine a target based on the first image;

determine that the target is not in the second image;

determine, based on the second image, that the target meets a tracking requirement;

process, based on that the target meets a tracking requirement, the first image and the second image to determine trajectory information of the target;

control, based on that the target is not in the second image, the pan-tilt to drive at least the second camera to move based on the trajectory information; and obtain, using the second camera, a third image that comprises the target.

19. A computing device, comprising:

one or more processors; and memory storing instructions that, when executed by the one or more processors, cause the computing device to:

determine a target based on a first image captured by a first camera;

determine, based on a second image, that the target meets a tracking requirement, wherein the second image is captured by a second camera, and a field of view of the first camera is greater than a field of view of the second camera;

determine that the target is not in the second image;

process, based on that the target meets a tracking requirement, the first image and the second image to determine trajectory information of the target; and control a pan-tilt to drive at least the second camera to move based on the trajectory information; and obtain, using the second camera, a third image that comprises the target.

* * * * *